Patented Jan. 11, 1927.

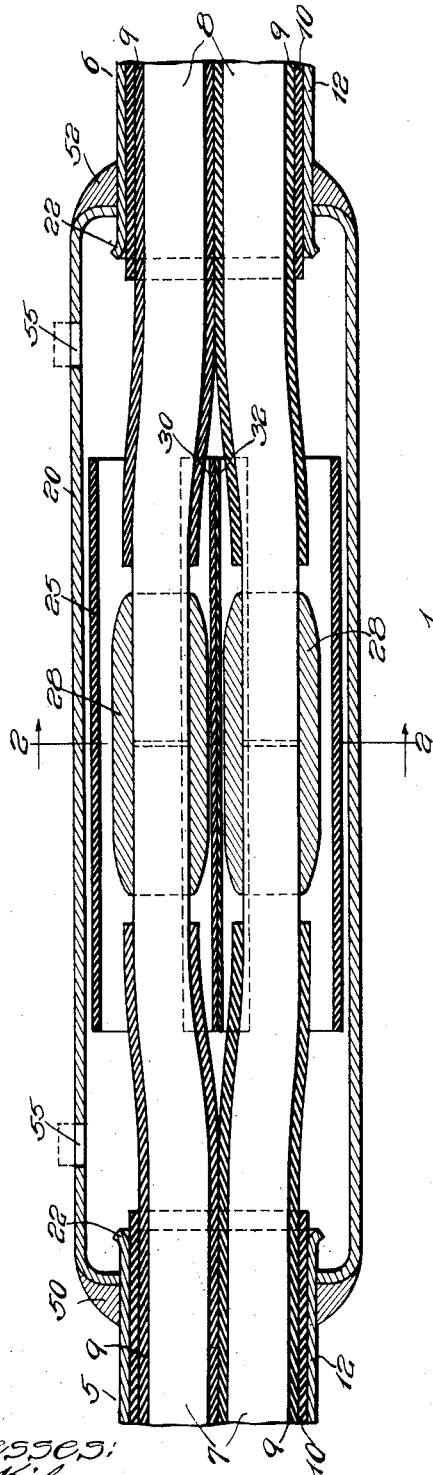

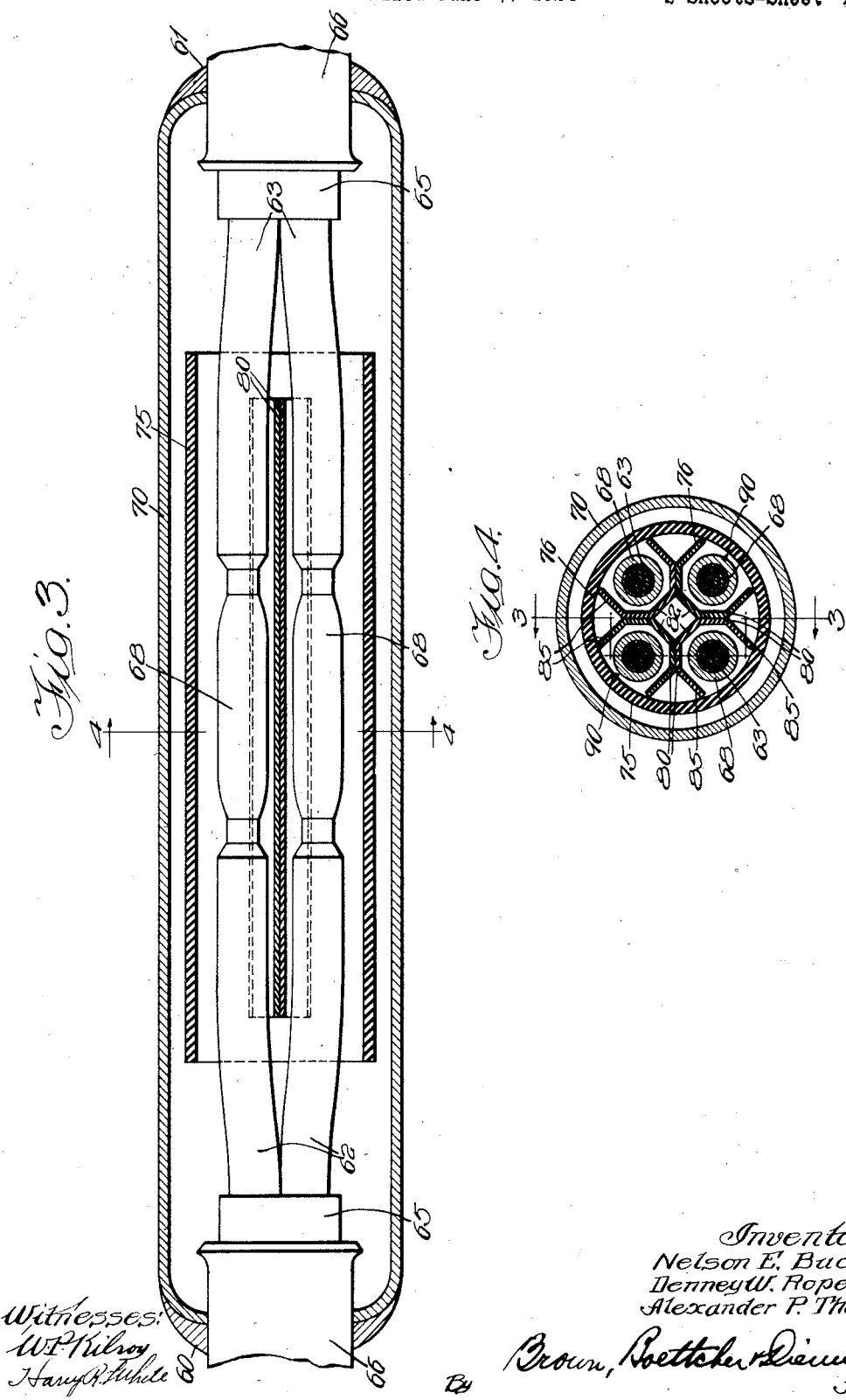

1,613,740

UNITED STATES PATENT OFFICE.

NELSON E. BUCK, DENNEY W. ROPER, AND ALEXANDER P. THOMS, OF CHICAGO, ILLINOIS.

CABLE JOINT.

Application filed June 7, 1924. Serial No. 718,446.

This invention relates to means for joining electrical conductors and more particularly to an improved cable joint, which while especially suitable for use in connection with cables in which the dielectric stresses are relatively low, is not limited to a particular use but may be employed wherever found adaptable.

In devices of this sort the joint is usually enclosed within a surrounding sleeve or tube of insulation which covers or surrounds the joined ends of the conductors and connections collectively. There is a further requirement in such devices, namely that of properly separating and insulating the conductors and connections within the sleeve from each other. Heretofore in making joints of this sort, low cost and simplicity has usually been sacrificed to provide great insulating strength and exceedingly low dielectric loss for use in connection with exceedingly high voltages. The separators and their manner of arrangement about the conductors and within the surrounding sleeve has usually been complicated and costly with a result that on lower voltages the insulation and dielectric properties have been considerably greater than necessary with the unnecessary higher cost and unnecessary complications in structure and installation.

The object of our present invention is to overcome the foregoing difficulties and more particularly to provide a generally improved and simplified joint that may be inexpensively made up and easily installed.

The parts of our improved joint are standardized and interchangeable and the joint can be installed without unwrapping or removing excessive lengths of insulation from the conductors and without excessive straightening of the conductors. The parts are all adapted to be made up at the factory. The separators are open so that they may be placed laterally about or between the conductors and instead of additional closing means for the open sides of the separators the surrounding insulating sleeve or tube encloses said sides and the separators are held against rotation with respect to each other so that their open sides always face the surrounding tube and accidental slipping or turning of said sides into register is prevented.

The invention is illustrated in the accompanying drawings in which;

Fig. 1 is a longitudinal section through a two conductor joint embodying the invention taken on line 1—1 of Fig. 2;

Fig. 2 is a transverse section on line 2—2 of Fig. 1;

Fig. 3 is a longitudinal section through a four conductor joint embodying the invention taken on line 3—3 of Fig. 4; and Fig. 4 is a transverse section on line 4—4 of Fig. 3.

In the embodiment shown in Figures 1 and 2, 5 and 6 designate the cable ends each of which comprises a plurality of conductors, 7—7 and 8—8 respectively in this particular instance. Each conductor 7 and 8 is individually covered or wrapped with insulation 9. A belt or layer of insulation 10 encloses the conductors 7—7 and 8—8 of the respective cable ends collectively and the insulating belt or layer 10 is usually covered with a lead sheath 12 for mechanical protection and to prevent the entrance of moisture. Use of the invention in connection with cables of various dimensions and in connection with cables having different numbers of conductors is contemplated. The cable shown in Figures 1 and 2 is simply illustrative of a typical two conductor cable and the invention is equally as applicable to cables having other numbers of conductors as will hereinafter appear.

The lead sheath 6 and insulating layer 10 is removed from the respective cable ends separating the separately insulated conductors 8 as shown. The lead sheath 20 is slipped over one of the cable ends such as 6 and the ends of the cable sheaths 12 are belled at 22 as usual.

The outer belt insulating sleeve 25 of the joint is also slipped over one of the cable ends, and the sheath 20 and sleeve or tube 25 are slipped back from the joint to permit convenient access to the cable ends to join the same as well understood in the art.

The individual conductors 7—7 and 8—8 are now bared of their individual insulation 9 and are united or joined by the usual copper splicing sleeves or coupling members 28. The bared ends of the cable conductors are usually united by entering them in abutting or end to end relation in copper sleeves 28 and uniting the conductor ends and sleeves as by means of solder.

For the purpose of separating and insulating the conductors and connections within the sleeve from each other we provide a pair of separators 30 and 32. These separators and the sleeve or tube 25 are any suitable insulating material having suitable mechanical and dielectric strength and of hygroscopic character so as not to absorb water. We find bakalite dilecto, suitable for this purpose.

The separators 30 and 32 having flat sides 34 and 35 respectively, which are placed in contact with each other and lie diametrically through the sleeve 25. The opposite edges 36 and 37 respectively of the separators are preferably flat and are inclined from the plane of contact between sides 34 and 35 edgewise toward the sleeve 25. It will now be apparent that each separator is individual to each conductor, i. e., to each pair of joined conductor ends 7—8.

The open sides of the separators 30 and 32 permit lateral installation between the conductors and thereby avoid making the casing or sheath 20 of excessive length and also avoid unwrapping or removing excessive lengths of insulation from the conductors as well as excessive straightening of the conductors. Construction and insulation is simplified and their cost decreased. The surrounding insulating sleeve or tube 25 encloses the open sides of separators 30 and 32 and the flat contacting sides of the separators holds them against rotation with respect to each other so that their open sides always face the surrounding tube and accidental slipping or turning of said sides into register is prevented. The inclined walls 36 and 37 may extend into edgewise engagement with the interior of sleeve 25 or clearance may be left between them and the interior of the sleeve. The edgewise presentation of said edges to the sleeve in either case minimize the stress cooperation with the sleeve and where they actually engage the sleeve an effective internal bracing is secured. In addition to the foregoing the inclined walls 36 and 37 have an additional function. They form with the open sided cable conductor compartments, auxiliary compartments 40 and 42 for the auxiliary or pilot wire 44 and 45 commonly employed in connection with cables of this sort. Such pilot wires are commonly employed for connecting relays or the like along the cable and in that they must extend from one end of the cable to the other or from one joint to or past another, their accommodation in the compartments 40 and 42 provides a highly desirable disposition for them.

The compartments formed by the separators may be large enough to accommodate the lay or helical twist of the cable conductors or they may be made smaller and the cable conductors straightened in their passage through the joint sleeve 25. Where they are straightened the length of straightening necessary is not excessive and in that the present joint is especially suitable for lower voltage use the dielectric properties are not impaired by said straightening nor by the flat contacting sides of the separators.

With the separators arranged between the joined cable ends the joint sleeve 25 is slipped or telescoped over the separators into the position shown in Fig. 1 thereby enclosing the joined cable end and the connections therebetween collectively and closing the open outer sides of the separators. The lead sheath 20 is then brought into proper position and the ends thereof are beaten in to meet the lead sheath 12 and the beaten in ends of the sleeve or sheath 20 are wiped to the sheath 12 as at 50 and 52. The sheath 20 is filled with an insulating compound which may be applied partially before and partially after or wholly after assembly. Any suitable insulating compound may be employed.

The parts of the joint are standardized and interchangeable and may be quickly and easily assembled or installed with a minimum of clearance. All parts of the joint may be made up at the factory, and we find that by forming them of a material suitable for the purpose, such as that already referred to, and of sufficient thickness for mechanical strength they will have an ample margin in dielectric strength.

In Fig. 1 we have designated at 55 typical filler openings through which the insulating compound may be introduced into the sheath 20. Where there is a clearance between the edges of the separators 30 and 32 and the interior of the tube 25 the shortest path from one conductor to the next through the filling compound would be around the edges of both separators, and by making the separators of sufficient thickness for mechanical strength, and of a material suitable for the purpose such as that already referred to, for example, they will have ample margin in the dielectric strength against loss therethrough.

In Figures 3 and 4 we have shown the invention in connection with a typical four strand or four conductor cable. In this case the cable ends 60 and 61 each comprises four conductors 62 and 63 respectively. As before each conductor 62 and 63 is individually covered with insulation and a belt or layer of insulation 65 encloses the conductors of the respective cable ends collectively and this belt or layer 65 is covered with a lead sheath 66 for mechanical strength and to prevent the entrance of moisture. The individual conductors 62 and 63 are bared of their individual insulation and are united or joined as before, by copper splicing sleeves or coupling members 68.

The splicing and joining of the cable ends and the installation of the cable joint parts as well as the installation of the surrounding sheath 70 may be substantially as described in connection with Figs. 1 and 2 and therefore will not be referred to in detail again.

The joint parts comprise an encasing or surrounding sleeve or tube 75 and separators 76, all of which may be made up at the factory as before, and may be of the insulating material referred to before, or any other suitable or preferred insulating material suitable for this purpose. The separators 76 are of open polygonal cross section as shown in Fig. 4, each having a pair of flat sides 80 which contact with the similar flat sides of adjacent separators. Inclined from one plane of contact to another are intermediate flat sides 82 which brace the separators centrally. Inclined from the opposite ends of the sides 80 are flat sides 85 which extend edgewise toward the sleeve 75 and preferably fit snugly therein as shown, although clearance may be allowed between them and the sleeve as pointed out in connection with the previous embodiment.

The edgewise presentation of these flat sides 85 to the sleeve minimizes the contact therewith and where there is contact, an exceedingly firm bracing of the separators internally within the sleeve is secured. As before, the separators 76 are individual to the respective conductors of the cable ends and the open sides 90 open outwardly when the separators are assembled as shown in Fig. 4. The outward opening of the separators permits lateral installation of them about the cable ends and connections therebetween with the advantages pointed out in the previous embodiment and instead of additional closing means for the outwardly opening sides the insulating sleeve 75 surrounds the separators collectively and closes the outwardly opening sides thereof. The flat contacting sides of the separator in addition to the advantageous internal bracing already pointed out, provides a non-revolvable contact between the separators, which prevents their turning with respect to each other. This prevents accidental turning of the open sides of the separators into register, in which case there would be no insulating wall of the separator between the conductors of the cable and the dielectric strength might be too low even in connection with the low voltages with which the present joint is especially adapted for use.

While in both embodiments of the invention shown the flat contacting sides of the separator lie diametrically through the surrounding sleeve or tube, this may, of course, vary. While the polygonal cross section of the separators which we have shown is highly suitable for the purpose intended, we do not intend to limit the invention to separators of a particular cross section. Where a different number of cable conductors are employed, the particular cross section may vary. The use of open sided separators individual to the respective conductors with their open sides facing outwardly and closed by a common surrounding tube or sleeve and the cooperation of the flat contacting sides which holds the respective separators against relative rotation and provides an advantageous internal bracing with the pilot or auxiliary wire forming compartment function of the inclined walls of the separators are important aspects of our invention. Where pilot wires are employed in connection with the embodiment shown in Fig. 1 they may extend through the central compartment or through any or all of the surrounding compartments formed by the inclined walls of the separators between the cable conductor compartments.

Suitable filler openings such as those shown at 55 in Fig. 1 may be provided for the encasing sheath shown in Fig. 3 for introducing the insulating compound therein.

We do not intend to be limited to the particular details shown and described, nor to the particular proportions, nor to the particular materials referred to as being preferable. Neither do we intend to limit the invention to use in connection with the particular types of cables shown.

We claim:

1. A cable joint insulating separator polygonal in shape having five substantially flat sides, two of which are substantially parallel and connected to a third side disposed in a plane substantially at right angles thereto by a pair of divergent sides, each of the said divergent sides forming substantially a 45° angle with the third side.

2. A cable joint insulating separator channel in shape and polygonal in cross section having a plurality of sides of substantially uniform thickness, one of the said sides having a contact surface for non-revolvable engagement with another separator.

3. In a cable joint, an enclosing sleeve of insulating material divided into a plurality of compartments by insulating separators of polygonal cross section extending lengthwise thereof, each having a plurality of flat sides, one of which contacts with that of an adjacent separator to render the separators non-rotatable with respect to each other, the said separators having sides cooperating with the inner wall of the said sleeve to form angular spaces intermediate the separators.

4. In a cable joint, an enclosing sleeve divided into a plurality of compartments by insulating separators extending longitudinally of the sleeve, each separator being open sided to form a channel for receiving an electrical conductor, each separator having a plurality of sides and legs one of which is in non-revolvable contact with that of an adjacent separator, adjacent separators also having diverging legs forming angular spaces intermediate them and the enclosing sleeve.

5. In a cable joint, an enclosing sleeve divided into a plurality of compartments by insulating separators, each having a plurality of substantially flat sides, two of which are divergent and are in planes at substantially right angles to each other, the divergent sides of one separator contacting with the divergent sides of adjacent separators to render the separators non-revolvable with respect to each other, each separator also having sides extending from the divergent sides towards the enclosing sleeve, each of said separators being thus open in construction and hence is enabled to readily receive an electrical conductor without distortion of the sides thereof before the separator is placed in the sleeve.

6. In a cable joint, an enclosing sleeve divided into a plurality of compartments by polygonal shaped insulating separators each having five substantially flat sides, two of which are substantially parallel and connected to a third side disposed in a plane substantially at right angles thereto by a pair of divergent sides, each of the said divergent sides forming a substantially 45° angle with the third side and a given angle with one of the parallel sides, the said parallel sides contacting with the enclosing sleeve, the said separators through their contacting sides being rendered non-revolvable with respect to each other.

7. In a cable joint, an enclosing sleeve divided into a plurality of compartments by polygonal shaped insulating separators each having five substantially flat sides, two of which are substantially parallel and connected to a third side disposed in a plane substantially at right angles thereto by a pair of divergent sides, each of the said divergent sides forming substantially a 45° angle with the third side and a given angle with one of the parallel sides, the said parallel sides contacting with the enclosing sleeve, the said separators through their contacting sides being rendered non-revolvable with respect to each other, each of the parallel sides being disposed at substantially right angles with respect to a parallel side of an adjacent separator forming an angular space having a cross-section substantially quadrant in form.

In witness whereof, we hereunto subscribe our names this 3rd day of June, 1924.

NELSON E. BUCK.
DENNEY W. ROPER.
ALEXANDER P. THOMS.